US008623208B2

(12) United States Patent
Lee

(10) Patent No.: US 8,623,208 B2
(45) Date of Patent: Jan. 7, 2014

(54) HOLLOW FIBER MEMBRANE MODULE AND PULLER USED THEREFOR

(71) Applicant: Kolon Industries, Inc., Kwacheon-si (KR)

(72) Inventor: Kwang-Jin Lee, Yongin-si (KR)

(73) Assignee: Kolon Industries, Inc., Kwacheon-Si (KR)

(*) Notice: Subject to any disclaimer, the term of this patent is extended or adjusted under 35 U.S.C. 154(b) by 0 days.

(21) Appl. No.: 13/936,894

(22) Filed: Jul. 8, 2013

(65) Prior Publication Data

US 2013/0291360 A1 Nov. 7, 2013

Related U.S. Application Data

(62) Division of application No. 12/935,528, filed as application No. PCT/KR2009/001406 on Mar. 19, 2009.

(30) Foreign Application Priority Data

Mar. 31, 2008 (KR) .................. 10-2008-0029895

(51) Int. Cl.
*B01D 65/00* (2006.01)
*B01D 63/02* (2006.01)
*B01D 29/96* (2006.01)

(52) U.S. Cl.
USPC . 210/237; 210/321.87; 210/232; 210/321.89; 210/321.78

(58) Field of Classification Search
USPC ......... 210/230, 236, 237, 238, 321.78–321.8, 210/321.87–321.89, 500.23
See application file for complete search history.

(56) References Cited

U.S. PATENT DOCUMENTS

| 4,219,426 | A | 8/1980 | Spekle et al. |
| 5,472,601 | A | 12/1995 | Eguchi |
| 6,280,626 | B1 | 8/2001 | Miyashita et al. |
| 2004/0060442 | A1 | 4/2004 | Nakahara et al. |
| 2006/0021929 | A1* | 2/2006 | Mannheim et al. ........ 210/321.6 |
| 2008/0164203 | A1 | 7/2008 | Nakahara et al. |
| 2009/0301961 | A1 | 12/2009 | Witthaus et al. |

FOREIGN PATENT DOCUMENTS

| DE | 10 2005 043 321 A1 | 3/2007 |
| EP | 0 706 818 A1 | 4/1996 |
| GB | 1 537 414 | 12/1978 |
| JP | 2000-442 A | 1/2000 |
| JP | 2002-35553 A | 2/2002 |

* cited by examiner

*Primary Examiner* — David C Mellon
*Assistant Examiner* — Pranav Patel
(74) *Attorney, Agent, or Firm* — Birch, Stewart, Kolasch & Birch, LLP

(57) ABSTRACT

A hollow fiber membrane module and a puller used therefore is disclosed, wherein each individual hollow fiber membrane module can be easily pulled out from a filtering apparatus provided with a plurality of hollow fiber membrane modules if it is required to be replaced or repaired. At this time, the hollow fiber membrane module comprises a hollow fiber membrane; and at least one header to which the hollow fiber membrane is potted, wherein the header includes a first lateral side to which the hollow fiber membrane is potted and a second lateral side opposite to the first lateral side, and wherein an engaging plate is formed at the second lateral side. Also, the puller comprises a main body; and a hooking member, extending from an end of the main body, formed in a shape suitable for being caught in the engaging plate.

2 Claims, 7 Drawing Sheets

PRIOR ART

HOLLOW FIBER MEMBRANE MODULE AND PULLER USED THEREFOR

This application is a Divisional of copending application Ser. No. 12/935,528 filed on Sep. 29, 2010, which is the U.S. National Phase of PCT/KR2009/001406, filed Mar. 19, 2009, and which claims priority of Application No. 10-2008-0029895 filed in Korea on Mar. 31, 2008. The entire contents of all of the above applications is hereby incorporated by reference.

TECHNICAL FIELD

The present invention relates to a hollow fiber membrane module and a puller used therefor, and more particularly, to a hollow fiber membrane module and a puller used therefor, wherein each individual hollow fiber membrane module can be easily pulled out from a filtering apparatus provided with a plurality of hollow fiber membrane modules if it is required to be replaced or repaired.

BACKGROUND ART

A separation method using a membrane has lots of advantages over the method based on heating or phase-changing. Among the advantages is high reliability of water treatment since the water purity required can be easily and stably satisfied by adjusting the size of the pores of a membrane. Furthermore, since the separation method using a membrane does not require a heating process, a membrane can be used with microorganism which is useful for separation process but may be adversely affected by heat.

Among the membrane employing separation methods is a method using a hollow fiber membrane module which comprises a bundle of hollow fiber membranes. Conventionally, the hollow fiber membrane module has been widely used in a micro-filtration field for producing axenic water, drinking water, super pure water, and so on. Recently, however, the application of the hollow fiber membrane module is being expanded to include sewage and waste water treatment, solid-liquid separation in a septic tank, removal of suspended solid (SS) from industrial wastewater, filtration of river, filtration of industrial water, and filtration of swimming pool water.

One kind of the hollow fiber membrane modules is a submerged-type hollow fiber membrane module which is submerged into a water tank filled with fluid to be treated. Negative pressure is applied to the inside of the hollow fiber membranes, whereby only fluid passes through the wall of each membrane and solid elements such as impurities and sludge are rejected and accumulate in the tank. When used for separation, the plural submerged-type hollow fiber membrane modules are installed in a frame structure. A submerged-type hollow fiber membrane module is advantageous in that the manufacturing cost is relatively low and that the installation and maintenance cost may be reduced since a facility for circulating fluid is not required.

FIG. 1 illustrates one example of a related art submerged-type hollow fiber membrane module.

In case of the related art submerged-type hollow fiber membrane module 100 shown in FIG. 1, a plurality of hollow fiber membranes 120 are arranged in a bundle between two headers 110. Both ends of the hollow fiber membrane 120 are respectively potted to confronting sides of the two headers 110 by an adhesive of polyurethane. In this case, a permeate collecting unit (not shown) is formed in each of the headers 110, wherein the permeate colleting unit is connected with open ends of the hollow fiber membrane 120 so as to collect permeate passing through the hollow fiber membrane 120.

Between the confronting sides of the two headers 110, there are two upper supporting members 131 and two lower supporting members 132 so as to stably maintain an interval between the two headers 110.

In the meantime, as shown in FIG. 2, a filtering apparatus using the submerged-type hollow fiber membrane module has a structure including a plurality of hollow fiber membrane modules 100a, 100b, 100c, and 100d packed into a frame structure (not shown), wherein the filtering apparatus performs a filtering process while being submerged into a liquid substrate containing impurities.

However, when the submerged-type hollow fiber membrane module is used to treat wastewater, the solids in the wastewater fouls the membranes causing their permeability to be declined as the water treatment is processed. Thus, while the water treatment is carried out by the hollow fiber membrane modules 100a, 100b, 100c, and 100d, an aeration process has to be performed for stably maintaining the high permeability of the membranes. In the aeration process, air is jetted from an aeration pipe (not shown) positioned under the hollow fiber membrane modules 100a, 100b, 100c, and 100d during the water treatment, thereby generating rising air bubbles. Thus, foreign materials are removed from the membrane surface owing to the rising air bubbles.

However, the respective hollow fiber membrane modules 100a, 100b, 100c, and 100d may be intensely shaken or vibrated due to the rising air bubbles from the aeration pipe for the aeration process of the filtering membrane. Furthermore, there is a high possibility that the hollow fiber membrane modules 100a, 100b, 100c, and 100d are damaged by their collision. In order to minimize the damage in the hollow fiber membrane modules 100a, 100b, 100c, and 100d, they have to be maintained for being in close contact with one another, fixedly.

If any one of the hollow fiber membrane modules 100a, 100b, 100c, and 100d has to be replaced or repaired due to the damage thereof, it is necessary to pull out the hollow fiber membrane module to be replaced or repaired from the filtering apparatus.

However, in the filtering apparatus of FIG. 2, the hollow fiber membrane modules 100a, 100b, 100c, and 100d are maintained for being in close contact with one another. In addition, each of headers 110a, 110b, 110c, and 110d in the hollow fiber membrane modules 100a, 100b, 100c, and 100d is provided with only flat surfaces. Thus, when trying to individually pull out the hollow fiber membrane module 100b or 100c, which is positioned in the center of the frame structure, among the hollow fiber membrane modules 100a, 100b, 100c, and 100d, a pulling force is hardly transmitted to the corresponding hollow fiber membrane module 100b or 100c without securing an enough space at both sides of the header 110b or 110c. Furthermore, a large-sized hollow fiber membrane module according to a recent trend requiring a large water-treatment capacity may cause more difficulty in individually pulling out each individual hollow fiber membrane module from the filtering apparatus.

DISCLOSURE

Technical Problem

Therefore, the present invention has been made in view of the above problems, and it is an object of the present invention to provide a hollow fiber membrane module and a puller used therefor, which is capable of preventing one or more problems of the related art.

Another object of the present invention is to provide a hollow fiber membrane module and a puller used therefor, wherein each individual hollow fiber membrane module can be easily pulled out from a filtering apparatus provided with a plurality of hollow fiber membrane modules if it is required to be replaced or repaired.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a hollow fiber membrane module comprises a hollow fiber membrane; and at least one header to which the hollow fiber membrane is potted, wherein the header includes a first lateral side to which the hollow fiber membrane is potted and a second lateral side opposite to the first lateral side, and wherein an engaging plate is formed at the second lateral side.

The pulling groove comprises a first groove which is open in a direction perpendicular to the second lateral side; and a second groove which extends from the first groove to the inner part of the header in a direction parallel to the second lateral side, wherein the engaging plate is a part of the second lateral side corresponding to the second groove. In this case, when the hollow fiber membrane module is pulled with a puller including a hooking member, the hooking member is firstly inserted into the first groove, and is then moved toward a direction parallel to the second lateral side so that the hooking member is inserted into the second groove.

At this time, at least a part of the first groove may be positioned at the same height as the second groove in a longitudinal direction of the header, or the entire first groove is positioned at a different height from the second groove in a longitudinal direction of the header.

Selectively, the engaging plate may protrude from the second lateral side of the header. In this case, when the hollow fiber membrane module is pulled with a puller including a hooking member, the hooking member is inserted into a gap between the second lateral side and the engaging plate.

The engaging plate is formed at the center of the second lateral side.

Selectively, a plurality of engaging plates are formed at the second lateral side. At this time, the plurality of engaging plates include at least one pair of engaging plates which are symmetric to each other with respect to a central line of the second lateral side, the central line being parallel to a longitudinal direction of the header.

When the hollow fiber membrane module is submerged into a liquid substrate to be treated, the header is arranged in such a way that the longitudinal direction of the header is perpendicular to a surface of the liquid substrate (that is, the longitudinal direction of the hollow fiber membrane is parallel to the surface of the liquid substrate).

In another aspect of the present invention, there is provided a puller for pulling out a hollow fiber membrane module from a frame structure, the hollow fiber membrane module including a header having a lateral side provided with an engaging plate, the puller comprising a main body; and a hooking member, extending from an end of the main body, formed in a shape suitable for being caught in the engaging plate.

In order to maximize the pulling-force transmission efficiency, the main body is perpendicular to each hooking member.

In addition, a pulling-force transmitting member is combined with the main body, and a plurality of handles are connected with the pulling-force transmitting member so that pulling forces from different directions might be applied to the puller at the same time.

Advantageous Effects

A hollow fiber membrane module according to the present invention and a puller used therefor has the following advantages.

Each individual hollow fiber membrane module can be easily pulled out from a filtering apparatus provided with a plurality of hollow fiber membrane modules if it is required to be replaced or repaired. In this case, even though the plurality of hollow fiber membrane modules are maintained in close contact with one another, the individual hollow fiber membrane module to be replaced or repaired can be easily pulled out from the filtering apparatus without disassembling the filtering apparatus.

34FIG. 7 shows that a hollow fiber membrane module according to one embodiment of the present invention is pulled out from a filtering apparatus by a puller according to one embodiment of the present invention.

Figure 8:
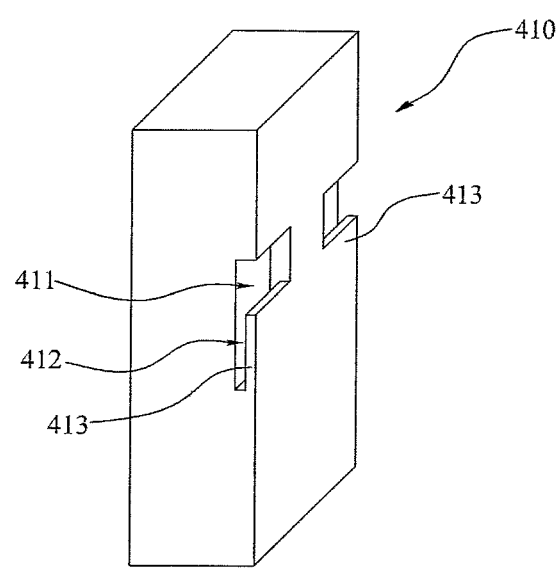
Figure 9:
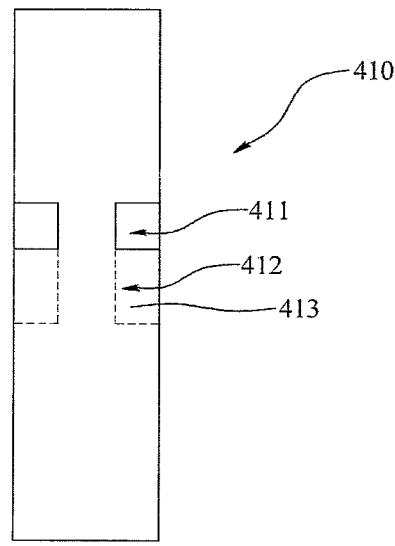

FIG. 8 is a perspective view illustrating a header in a hollow fiber membrane module according to another embodiment of the present invention, and FIG. 9 is a lateral view thereof.

FIGS. 10 to 13 are lateral views illustrating hollow fiber membrane modules according to other embodiments of the present invention.

Figure 14:
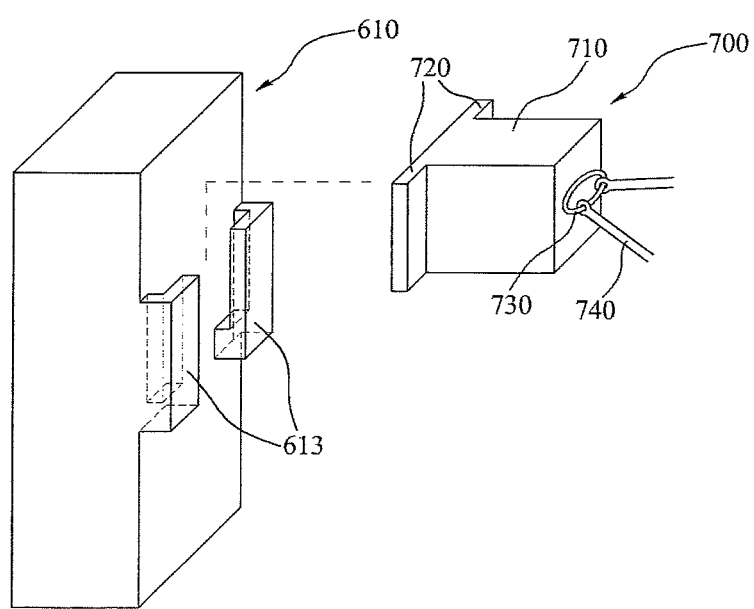

FIG. 14 shows that a hollow fiber membrane module according to another embodiment of the present invention is pulled out from a filtering apparatus by a puller according to another embodiment of the present invention.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a hollow fiber membrane module according to the present invention and a puller used therefor will be explained with reference to the accompanying drawings.

Figure 1:
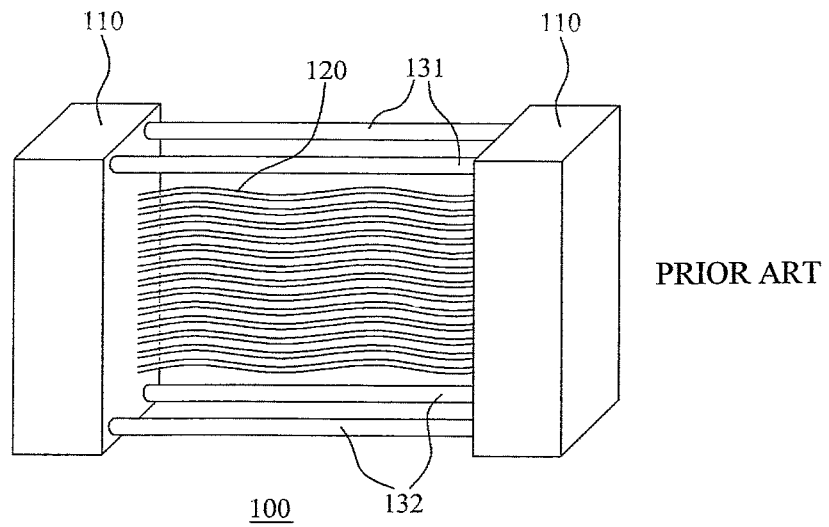
FIG. 1 is a perspective view illustrating a related art hollow fiber membrane module.
Figure 2:
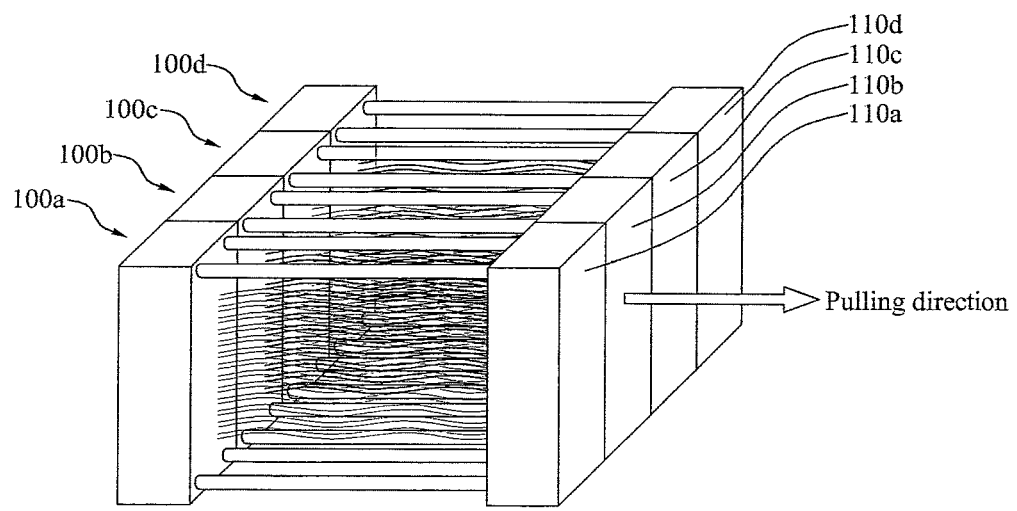
FIG. 2 is a perspective view illustrating a packing structure of related art hollow fiber membrane modules.
Figure 3:
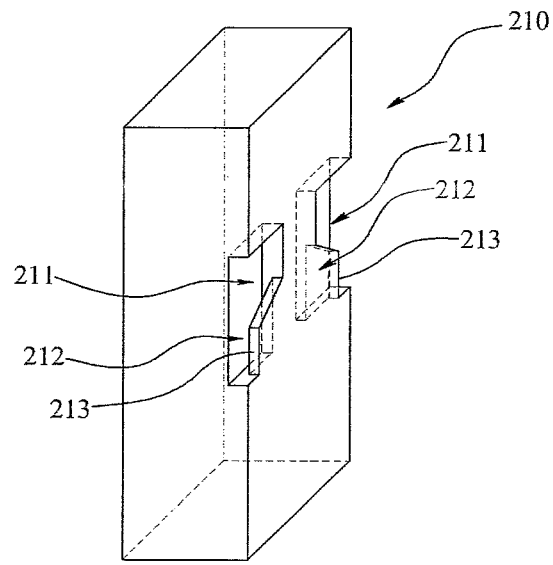
FIG. 3 is a perspective view illustrating a header in a hollow fiber membrane module according to one embodiment of the present invention.
Figure 4:
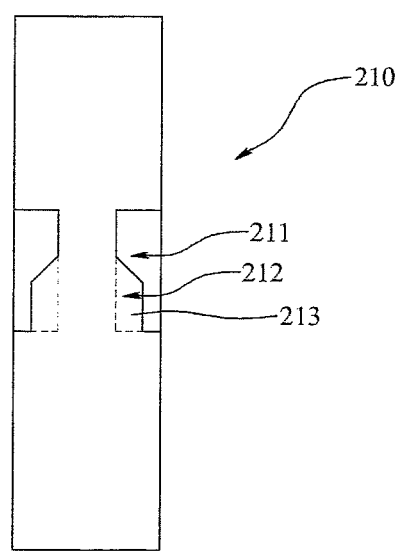
FIG. 4 is a lateral view thereof.
Figure 5:
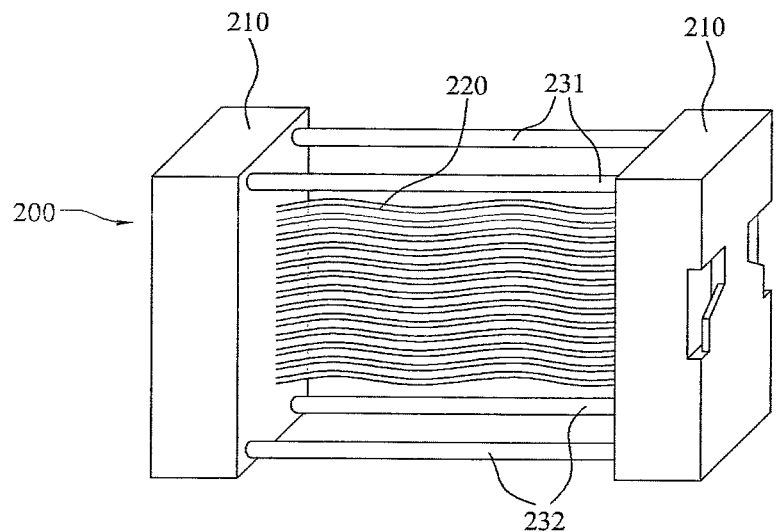
FIG. 5 is a perspective view illustrating a hollow fiber membrane module according to one embodiment of the present invention.
Figure 6:
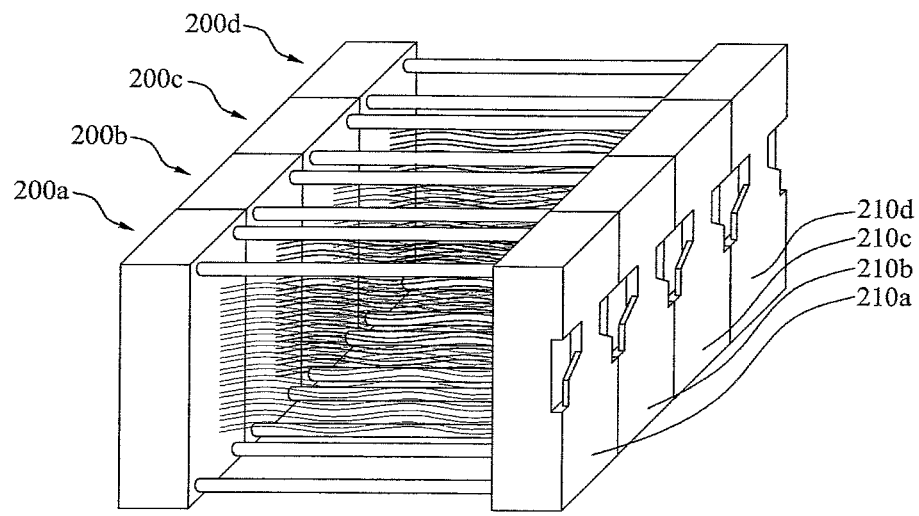
FIG. 6 is a perspective view illustrating a packing structure of hollow fiber membrane modules according to one embodiment of the present invention.

FIG. 3 is a perspective view illustrating a header in a hollow fiber membrane module according to one embodiment of the present invention, and FIG. 4 is a lateral view thereof. FIG. 5 is a perspective view illustrating a hollow fiber membrane module according to one embodiment of the present invention. FIG. 6 is a perspective view illustrating a packing structure of hollow fiber membrane modules according to one embodiment of the present invention.

As shown in FIGS. 3 to 6, a hollow fiber membrane module 200 according to the present invention includes two headers 210, wherein a plurality of hollow fiber membranes 220 are arranged in a bundle between the two headers 210. In this case, both ends of the hollow fiber membrane 220 are respectively potted to confronting sides of the two headers 210 by an adhesive such as polyurethane. Also, a permeate collecting unit (not shown) is formed in each of the two headers 210, wherein the permeate colleting unit is connected with open ends of the hollow fiber membrane 220 so as to collect permeate passing through the hollow fiber membrane 220.

Between the confronting sides of the two headers 210, there are two upper supporting units 231 and two lower supporting units 232 so as to stably maintain an interval between the two headers 210.

A filtering apparatus including the plurality of hollow fiber membrane modules 200a, 200b, 200c, and 200d packed therein is submerged into a liquid substrate, and carries out a filtering process filter the impurities from the liquid substrate.

Herein, there is an exemplary case using the two headers 210 so as to collect permeate from the both ends of the hollow fibber membrane 220 in the hollow fiber membrane module 200. However, it is not limited to the exemplary case using the two headers 210. For example, another exemplary case of a hollow fiber membrane module with one header can be made within the spirit or scope of the present invention, wherein one header is used to collect permeate from one end of a hollow fiber membrane.

As shown in FIGS. 3 to 6, the header 210 in the hollow fiber membrane module according to one embodiment of the present invention includes a first lateral side to which the hollow fiber membrane 220 is potted, and a second lateral side opposite to the first lateral side. Also, a pair of engaging plates 213 is provided at the second lateral side. In this case, the pair of engaging plates 213 are symmetric to each other with respect to a center line of the second lateral side, wherein the center line is parallel to a longitudinal direction of the header 210.

The pair of engaging plates 213 is made by forming a pair of pulling grooves at the second lateral side of the header 210. Each pulling groove includes a first groove 211 and a second groove 212, wherein the first groove 211 is open in a direction perpendicular to the second lateral side, and the second groove 212 extends from the first groove 211 to the inner part of the header 210 in a direction parallel to the second lateral side. Herein, the engaging plate 213 is a part of the second lateral side corresponding to the second groove 212.

The pulling groove may be made by partially removing the flat lateral side of the header 210 after firstly forming the header 210, or may be made simultaneously when forming the header 210 by a molding method.

Figure 7:
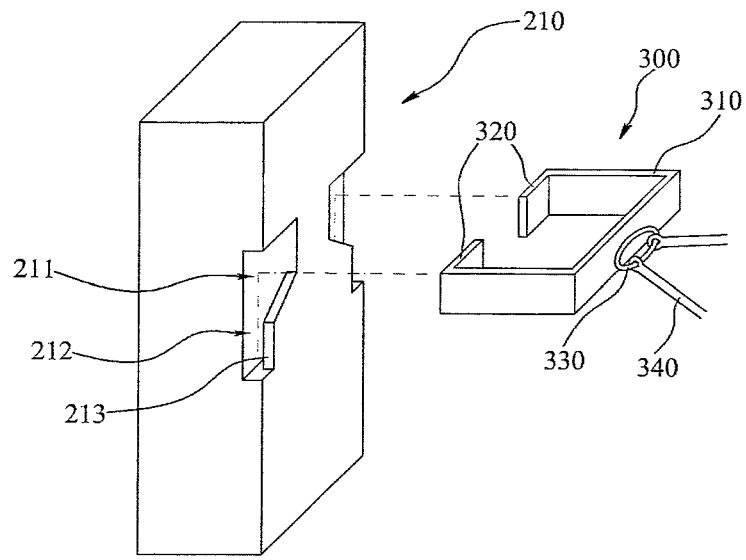

FIG. 7 shows that the hollow fiber membrane module 210 according to one embodiment of the present invention is pulled out from the filtering apparatus by a puller 300 according to one embodiment of the present invention.

As shown in FIG. 7, the puller 300 according to one embodiment of the present invention includes a main body 310. Also, the puller 300 further includes a pair of hooking members 320 which respectively extends from both ends of the main body 310. The pair of hooking members 320 is formed in shapes suitable for being caught in the pair of engaging plates 213 formed at the lateral side of the header 210 in the hollow fiber membrane module.

In order to pull the hollow fiber membrane module 200 by the puller 300 according to the present invention, the pair of hooking members 320 is firstly inserted into the first groove 211 and is then moved in a direction parallel to the second lateral side, whereby the pair of hooking members 320 is inserted into the second groove 212. Then, according as a pulling force is applied to the puller 300, the pulling force is transmitted to the engaging plates 213 through the pair of hooking members 320, to thereby pull out the hollow fiber membrane module 200.

At this time, the main body 310 is perpendicular to the pair of hooking members 320 so as to maximize the pulling-force transmission efficiency, preferably.

Also, a pulling-force transmitting member 330 is combined with the main body 310, and a plurality of handles 340 are connected with the pulling-force transmitting member 330, so that pulling forces from different directions might be applied to the puller at the same time.

In the meantime, the shape of the main body, the shape of the hooking member, and the combined shape of the main body and the hooking member in the puller may be changed by the number, shape and position of engaging plates in the headers of the hollow fiber membrane modules according to the various embodiments of the present invention.

FIG. 8 is a perspective view illustrating a header in a hollow fiber membrane module according to another embodiment of the present invention, and FIG. 9 is a lateral view thereof.

As shown in FIGS. 8 and 9, a pair of engaging plates 413 is formed at a lateral side of a header 410 in a hollow fiber membrane module according to another embodiment of the present invention. In this case, the pair of engaging plates 413 are symmetric to each other with respect to a center line of the lateral side, wherein the center line is parallel to a longitudinal direction of the header 410.

The pair of engaging plates 413 is made by forming a pair of pulling grooves at the lateral side of the header 410. Each pulling groove includes a first groove 411 and a second groove 412, wherein the first groove 411 is open in a direction perpendicular to the lateral side, and the second groove 412 extends from the first groove 411 to the inner part of the header 410 in a direction parallel to the lateral side. Herein, the engaging plate 413 is a part of the lateral side corresponding to the second groove 412.

Unlike the aforementioned embodiment shown in FIGS. 3 to 7, which illustrates that a part of the first groove 211 is positioned at the same height as the second groove 212 in the longitudinal direction of the header 210, this embodiment shown in FIGS. 8 and 9 illustrates that the entire first groove 411 is positioned at the different height from the second groove 412 in the longitudinal direction of the header 410.

FIGS. 10 to 13 are lateral views illustrating hollow fiber membrane modules according to other embodiments of the present invention.

As explained above, the header of the hollow fiber membrane module according to the present invention may be provided with the engaging plates which are variable in shape or number, wherein the engaging plates are provided at the lateral side of the header.

Figure 10:
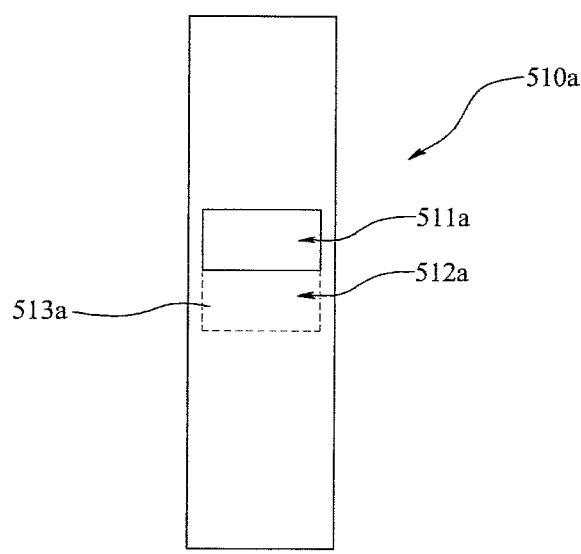

In a hollow fiber membrane module of FIG. 10, an engaging plate 513a is formed at the center of a lateral side of a header 510a. In this case, an entire first groove 511a is positioned at a different height from a second groove 512a in a longitudinal direction of the header 510a.

Figure 11:
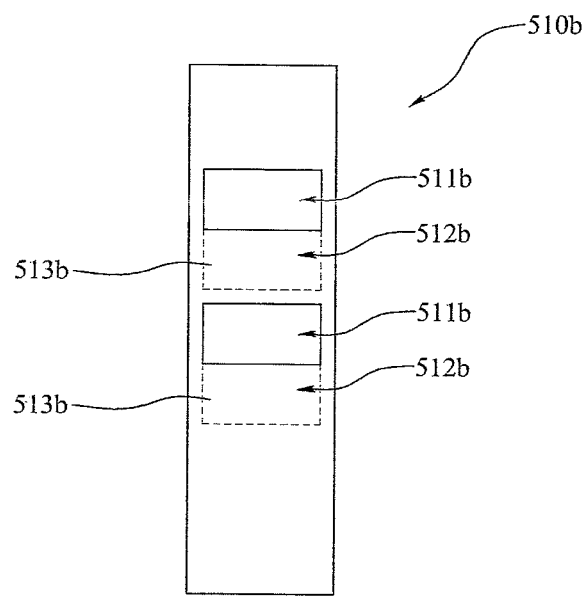

In a hollow fiber membrane module of FIG. 11, two engaging plates 513b are formed at the center of a lateral side of a header 510b, wherein the two engaging plates 513b are provided along a longitudinal direction of the header 510b. In this case, an entire first groove 511b is positioned at a different height from a second groove 512b in the longitudinal direction of the header 510b.

Figure 12:
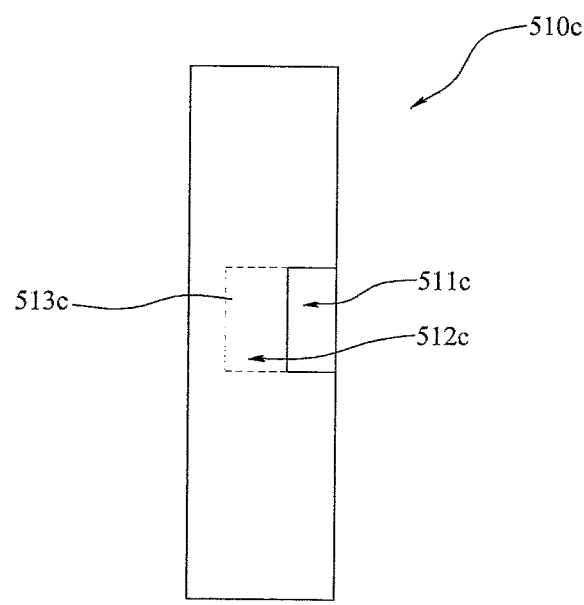

In a hollow fiber membrane module of FIG. 12, an engaging plate 513c is formed at the center of a lateral side of a header 510c. In this case, an entire first groove 511c is positioned at the same height as a second groove 512c in a longitudinal direction of the header 510c.

Figure 13:
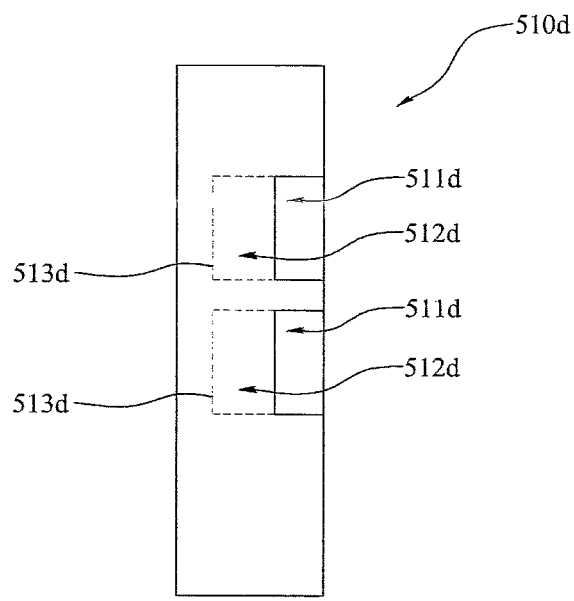

In a hollow fiber membrane module of FIG. 13, two engaging plates 513d are formed at the center of a lateral side of a header 510d, wherein the two engaging plates 513d are provided along a longitudinal direction of the header 510d. In this case, an entire first groove 511d is positioned at the same height as a second groove 512d in the longitudinal direction of the header 510d.

According to the aforementioned embodiments of FIGS. 3 to 13, the pulling groove is formed at the lateral side of the header of the hollow fiber membrane module, whereby a part of the lateral side is used as the engaging plate. However, it is not limited to the exemplary case using a part of the lateral side as the engaging plate. Instead, an additional engaging structure may protrude from a lateral side of a header, which will be explained with reference to FIG. 14.

FIG. 14 shows that a hollow fiber membrane module according to another embodiment of the present invention is pulled out from a filtering apparatus by a puller according to another embodiment of the present invention.

As shown in FIG. 14, a pair of engaging plates 613 protrudes from a lateral side of a header 610 in a hollow fiber membrane module according to another embodiment of the present invention. In this case, the pair of engaging plates 613 are symmetric to each other with respect to a central line of the lateral side of the header 610, wherein the central line is parallel to a longitudinal direction of the header 610. The pair of engaging plates 613 may be formed by combining an additional engaging structure with the lateral side of the header manufactured. Preferably, the engaging plates and the header are formed at the same time by molding.

After inserting a pair of hooking members 720 into each gap between the lateral side of the header 610 and the engaging plate 613, respectively, a pulling force is applied to a puller 700, whereby the pulling force is transmitted to the engaging plates 613 through the hooking members 720, thereby pulling out the hollow fiber membrane module.

The pair of hooking members 720 of the puller 700 used in this embodiment of the present invention is extended from one end of a main body 710, wherein the respective hooking members 720 extend in opposite directions.

In order to maximize the pulling-force transmission efficiency, the main body 710 is perpendicular to the hooking members 720, preferably.

Also, a pulling-force transmitting member 730 is combined with the main body 710, and a plurality of handles 740 are connected with the pulling-force transmitting member 730, so that pulling forces from different directions might be applied to the puller 700 at the same time.

The aforementioned embodiments of the present invention relate with a horizontal-type hollow fiber membrane module whose header is arranged in such a way that the longitudinal direction of the header is perpendicular to the surface of the liquid substrate (that is, the longitudinal direction of the hollow fiber membrane is parallel to the surface of the liquid substrate), when the hollow fiber membrane module is submerged into the liquid substrate to be treated.

However, the present invention is not limited to the horizontal-type hollow fiber membrane module. That is, the present invention can be applied to a vertical-type hollow fiber membrane module whose header is arranged in such a way that the longitudinal direction of the header is parallel to the surface of the liquid substrate (that is, the longitudinal direction of the hollow fiber membrane module is perpendicular to the surface of the liquid substrate), when the hollow fiber membrane module is submerged into the liquid substrate to be treated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for pulling out a hollow fiber membrane module installed in a frame structure with a puller including a hooking member, the hollow fiber membrane module comprising a hollow fiber membrane and at least one header to which the hollow fiber membrane is potted, the header including a first lateral side to which the hollow fiber membrane is potted and a second lateral side opposite to the first lateral side, the second lateral side having a pulling groove, the pulling groove comprising a first groove open in a direction perpendicular to the second lateral side and a second groove extending from the first groove to an inner part of the header in a direction parallel to the second lateral side so that an engaging plate corresponding to the second groove is formed, the method comprising:

inserting the hooking member into the first groove;

moving the hooking member in a direction parallel to the second lateral side so that the hooking member is inserted into the second groove; and applying pulling force to the puller so that the pulling force is transmitted to the engaging plate through the hooking member.

2. The method of claim 1, wherein the pulling force is applied to the puller from different directions at the same time.

* * * * *